(No Model.)
G. F. FORBES.
AUTOMATIC RAILWAY GATE.
No. 245,618. Patented Aug. 16, 1881.
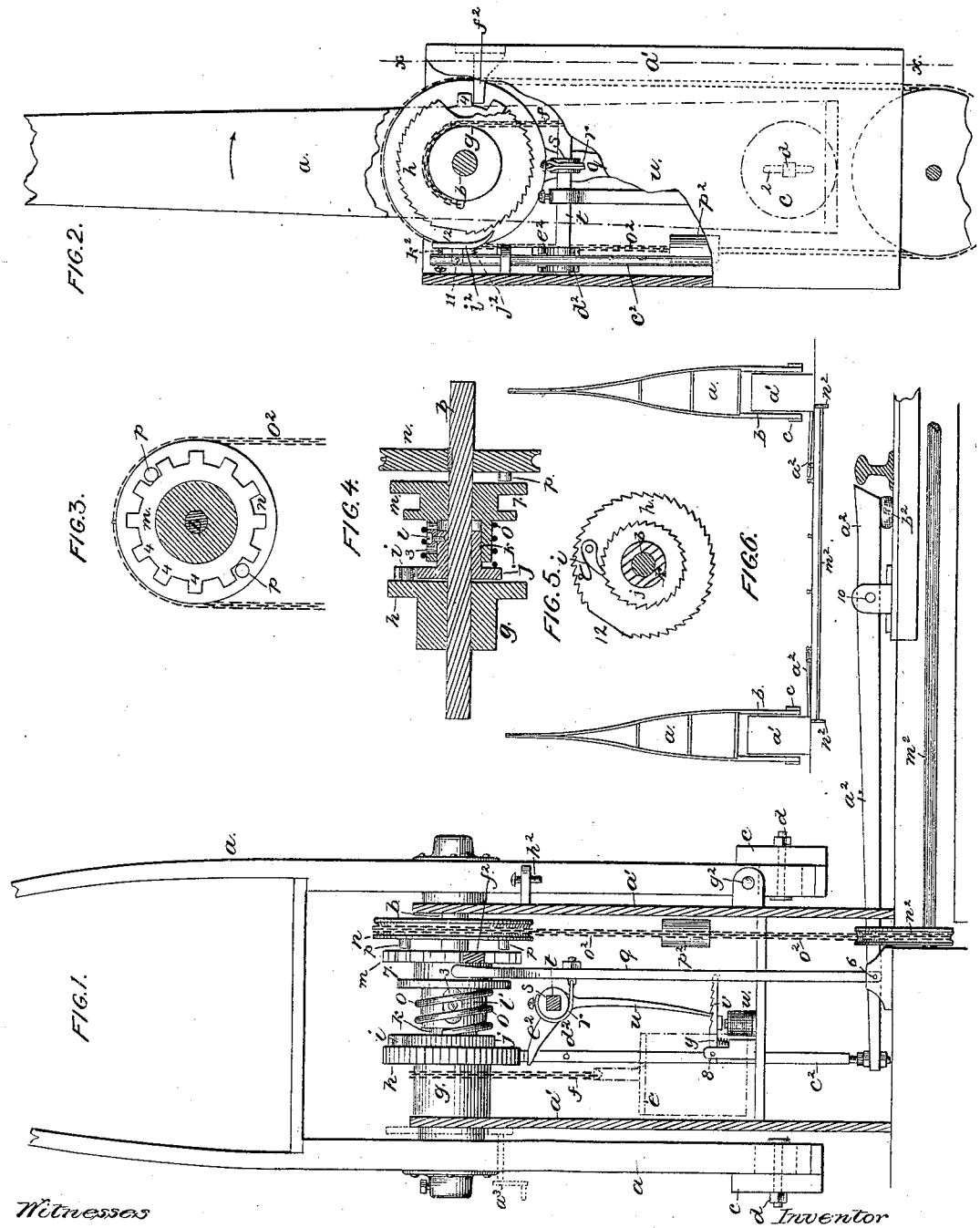
Witnesses
Arthur Reynolds
W. H. Sigston
Inventor
George F. Forbes,
by Crosby Gregory,
Attys.

UNITED STATES PATENT OFFICE.

GEORGE F. FORBES, OF BOSTON, MASSACHUSETTS.

AUTOMATIC RAILWAY-GATE.

SPECIFICATION forming part of Letters Patent No. 245,618, dated August 16, 1881.

Application filed February 19, 1881. (No model.)

*To all whom it may concern:*

Be it known that I, GEORGE F. FORBES, of Boston, Suffolk county, State of Massachusetts, have invented Improvements in Automatic Railway-Gates, of which the following description, in connection with the accompanying drawings, is a specification.

My invention relates to a gate, shown as employed for guarding a highway at a point where it crosses the line of railway, and has for its object to enable the said gate to be operated automatically at the proper times by the trains passing on the said line of railway.

The invention is shown embodied in a gate mounted on a horizontal axis at the side of the road or highway that it is to protect, and intended to stand in vertical position when the passage is safe, and to be turned down to a horizontal position, extending across the roadway, when a train is about to pass. The gate is shown as fixed upon a shaft mounted in bearings in a suitable frame-work, and is so balanced that it normally turns to and remains in a vertical position when the said shaft is not engaged and acted upon by the gate-closing mechanism.

The invention consists, first, in the combination, with the movable gate, of suitable mechanism actuated by a weight or spring, which, when engaged with the gate by means of a suitable clutch or engaging device, moves it from its normal or vertical position into a position across the highway.

The invention also consists in the combination, with the gate and its actuating mechanism, of a detent or trigger to hold them normally disengaged, except when the said detent is released by the action of the approaching train when at a sufficient distance to permit the closing of the gate to insure the proper guarding of the highway before the arrival and passage of the said train. This detent is shown in this instance as controlled by an electro-magnet, which may itself be controlled or vitalized by a suitable circuit-closer or magneto-electric generator in circuit therewith, and operated from or by the approaching train. Such circuit-closers or generators are well known, and require no description, as they form no part of my present invention.

The invention further consists in a disengaging device operated by the train when it arrives at the gate to disconnect the gate-closing mechanism from the said gate or its shaft, and at the same time to set the trigger or detent device in position to be operated upon by the next train, this operation leaving the gate free to rise or open itself by its own weight, as before described. When the gate-actuating mechanism is thus disengaged from the gate its actuating weight or spring is relieved of the weight of the gate, and has no further work to do; and in order to prevent it from then running down it is engaged by a locking device in the movement by which it is disengaged from the gate-shaft, the said locking device being shown in this instance as a projection fixed to the frame-work in such position as to engage the teeth of the movable portion of the clutch by which the said gate and actuating mechanism are engaged and disengaged from one another. The disengaging device by which the gate and its actuating mechanism are disconnected by the action of the passing train on a track-lever is also provided with suitable mechanism to automatically wind the said actuating weight or spring by the action of the successive wheels of the passing train.

The actuating mechanism, when disengaged from the gate, is always locked with its engaging device or clutched portion in the same position relative to the frame-work, so that if the gate be always stopped in the same position relative to the said frame-work the portion of the clutch connected therewith will be in the proper position to be engaged and disengaged by the other portion of the clutch; and to insure this result the invention further consists in fixing stops upon the frame-work to limit the movement of the gate in either direction, the said stops being made adjustable in order to enable the proper action of the clutch to be readily attained.

When desired, two gates may be connected together by suitable gearing and operated simultaneously by the gate-closing mechanism, and when situated on opposite sides of a double-track road each will be provided with actuating mechanism controlled by the trains on the adjacent track. In this arrangement, if two trains come at about the same time, the first train will first trip its trigger and cause the corresponding actuating mechanism to operate and close both gates, after which, or at any time during the movement of the gates in either direction, the train on the other track may cause the other actuating mechanism to be thrown into engagement, after which the gates will not be opened until both of the said actuating mechanisms have been disengaged by the passage of both trains, so that no accident can occur by the opening of the gate after but one of the trains had passed.

Figure 1 is a front view of a portion of a gate and its operating mechanism embodying my invention, the front portion of the frame-work being removed to better exhibit the working parts; Fig. 2, a side elevation thereof, with a portion of the frame-work and gate broken away; Fig. 3, a sectional detail of the clutch mechanism on a plane transverse to the gate-shaft; Fig. 4, a longitudinal section of the gate-shaft and devices mounted thereon; Fig. 5, a sectional detail of the winding-ratchet and hub; and Fig. 6, a front elevation on a smaller scale, showing two gates connected together.

The gate $a$, fixed upon the main or gate shaft $b$, mounted in suitable bearings in the frame-work $a'$, located in proper position at the side of the road which is to be protected, is provided with a counterbalance-weight, $c$, fastened thereto by a bolt, $d$, passing through a slot, 2, in the said gate, whereby it is made adjustable toward and from the axis or shaft $b$ of the gate to enable the said gate to be just overbalanced, so that when free to turn on its bearing it will assume the vertical position shown in the drawings.

The gate-actuating mechanism, by which it is closed when the train approaches, is primarily actuated in this instance by the weight $e$, suspended upon the chain $f$, wound upon the barrel or drum $g$, shown as mounted on the gate-shaft $b$ loosely, or free to turn independently thereof. The said drum has at one end a ratchet-toothed disk, $h$, provided with a pawl, $i$, that engages the ratchet $j$ on a hub, $k$, also loose on the shaft $b$, and causes the said hub to turn with the drum in its movement caused by the weight $e$, but permits the latter to move independently when turned in the opposite direction to wind up the said weight, as hereinafter described.

The hub $k$ is provided with a stud, $l$, having a friction-roller which enters a slot, 3, in the movable portion $m$ of a clutch or engaging device mounted loosely upon the said hub $k$ and shaft $b$, and caused to accompany the said hub in its movement produced by the weight $e$ by the engagement of the stud $l$ in the slot 3, which, however, permits the independent movement of the said portion $m$ of the clutch along the shaft $b$ toward and from the portion $n$ of the clutch fixed upon the said shaft $b$, and having no movement independent thereof. The movable portion $m$ of the clutch is provided with teeth 4 at its circumference, and it is constantly pressed, by the spring $o$ reacting on the hub $k$, toward the fixed portion $n$ of the clutch, which is shown as a disk provided with one or more pins or projections, $p$, which pass between and are engaged by the teeth of the portion $m$, when moved up by the spring $o$, thus bringing the force of the weight $e$ to bear on the shaft $b$. The said weight is sufficient to overcome the weight of the gate and its counterpoise, and cause it to turn into its other or horizontal position across the roadway, and, together with the chain $f$, drum $g$, hub $k$, and their connecting ratchet and pawl, and the portion $m$ of the clutch or engaging device $m$ $n$, constitutes the gate-actuating mechanism, since, when engaged with the gate-shaft and gate by the movement of the engaging device, it causes the gate to be moved as desired.

The clutch $m$ $n$ is normally held disengaged by the shipper $q$, pivoted at 6, and provided with a fork to enter the annular groove 7 in the portion $m$ of the clutch. The shipper $q$ is connected by a flexible cord or chain, $r$, with a drum or pulley, $s$, fixed upon a shaft, $t$, provided with a long finger, $u$, which, when the shaft is rotated to wind the cord $r$, and thereby move the shipper $q$ to disengage the clutch $m$ $n$, as heretofore described, is itself engaged by a tooth on the armature-lever $v$, controlled by the electro-magnet $w$ and retracting-spring $y$, in the usual manner, the said armature-lever $v$ thus forming a trigger to release the finger $u$, and thus allow the spring $o$ to operate to throw the clutch $m$ $n$ into engagement and cause the weight $e$ to close the gate. The said trigger or armature-lever $v$ may be placed under the control of the approaching train at a point at any desired distance in any desired manner, as by any of the well-known circuit-closers operated from or by a passing train and controlling the electrical condition of the magnet $w$.

On single-track roads circuit-closers operated by wheels passing in one direction but not in the other, such as shown in United States Letters Patent No. 108,633, dated October 25, 1870, may be employed; or the said circuit-closer may be otherwise arranged to be operated from or by the train in approaching but not in receding from the crossing.

When the trigger $v$ has been operated to release the finger $u$, and thus cause the weight $e$ to close the gate, the parts will remain in this position, the clutch $m$ $n$ engaged, and the weight $e$ holding the gate closed until the train arrives at the gate apparatus, when the wheels will strike the track-lever $a^2$, pivoted at 10, compressing the spring $b^2$ thereunder and causing the said lever to raise the connected rod $c^2$, and as the successive wheels pass a series of reciprocating movements is produced in the said rod $c^2$.

The rod $c^2$ is provided with a pin, $d^2$, which at its first upward movement caused by the passing wheels engages the arm $e^2$, fixed to the shaft $t$, thus rotating the said shaft, to thereby wind the cord $r$ and disengage the clutch $m$ $n$, the parts $c^2$ $d^2$, in connection with the shaft $t$, arm $e^2$, and shipper $q$, forming the disengaging mechanism. When the clutch $m$ $n$ is thus disengaged the gate is left free to rise; and in order that the weight $e$ may not run down when thus relieved from the weight of the gate, it is held by the locking device, shown as a projection, $f^2$, fixed to the frame-work, which falls into the space between the teeth of the movable portion $m$ of the clutch as it is withdrawn by the shipper $r$ from the fixed portion $n$.

The projections $p$ on the disk $n$ and the locking-projection $f^2$ are so located relative to the movable portion $m$ of the clutch that its teeth 4 will be brought into position to engage the one before they are disengaged from the other; and the gate has adjustable stops $g^2$ $h^2$ on the frame-work $a'$ to limit its movement in either direction, the former stopping the gate when up or open in position to bring the projections $p$ opposite the spaces between the teeth of the movable portion $m$ of the clutch, so that it can move freely under the action of the spring $o$ when released by the trigger or detent $i$, and the latter stop, $h^2$, keeping the gate when closed under the action of the weight $e$ in such position that the locking-projection $f^2$ is opposite a space between the teeth of the said portion $m$ of the clutch.

The rod $c^2$ is provided with a pawl, $i^2$, pivoted at 11, which, as the said rod reciprocates under the action of the wheels and spring $b^2$, will engage the teeth of the winding-ratchet $h$, connected with the drum $g$, and rotate it in a proper direction to wind up the chain $f$ and raise the weight $e$, the said pawl engaging the teeth of and rotating the ratchet $h$ in its downward movement caused by the spring $b^2$. This pawl $i^2$, pressed by the spring $j^2$, is so adjusted by the stop $k^2$ as to be disengaged from the said ratchet $h$ at the end of its downward movement, which is its normal position. A blank space, 12, is left on the ratchet $h$, over which the pawl $i^2$ moves without engagement when the weight is wholly wound up, thereby preventing injury to the apparatus.

It is often desirable, especially upon double-track railways, to have a gate at each side of the railway, both to be operated simultaneously, as shown in Fig. 6, and for this purpose the clutch-disk $n$ may be made as a pulley, as shown, to operate through suitable driving chains or belts upon the similar pulley in the apparatus on the other side of the track, which will also operate like the one shown in Figs. 1 and 2. These connections, in this instance, consist of a shaft, $m^2$, extended across under the lines of rails, and provided with a pulley, $n^2$, at each end, connected by driving-chains $o^2$ with the pulleys $n$ on the gate-shaft $b$ of the two gates. In this case either of the weights $e$ will have to be sufficient to turn both of the gates, and in case the gates have both been closed by a train on one track, and a second train should come on the other track before the gates had been opened, the second train would cause the clutch $m$ $n$ of the corresponding apparatus to be thrown into engagement and its weight $e$ be brought to bear on the shaft $b$, so that if the first train had passed and by the lever $a^2$ had caused its clutch to be disengaged the weight $e$ of the other apparatus would still retain the gates closed until its clutch was disengaged by the passage of the train on the adjacent track. Consequently neither of the gates would open until both trains had passed.

The driving-chain $o^2$, as shown, is provided with a small weight, $p^2$, acting in the direction to cause the gates to open, such weight being an auxiliary to the weight $e$ and having a constant action for all positions of the gate, while the tendency of the weight $c$ to turn the gate becomes less as it approaches the vertical position. It will be seen that the gate is hung freely in its bearings, and is acted upon alternately by weights just sufficient to overbalance it and cause it to move in one direction or the other, the rapidity or slowness of such movement depending upon the relation of the excess of weight to the whole weight moved, so that the movement may be as slow as necessary to give sufficient warning before the highways are wholly obstructed, and in any case the gates may be moved in either direction by any external force.

A crank, $a^3$, is shown in dotted lines, Fig. 1, to enable the gates to be readily moved by hand when desired, the said crank being preferably disengaged or removed when not in use to relieve the weights of the work of turning it.

The armature-lever $v$ is shown as provided with several teeth, so that the heaviest blow upon the lever $a^2$ will cause the finger $u$ to be engaged and held in such position that the arm $e^2$ will not be reached by the pin $d^2$ in its subsequent movement produced by lighter blows upon the lever $a^2$. By this arrangement the said arm $e^2$, with the clutch and connected parts, is not subjected to a continuous vibration while the train is passing, but usually remains wholly disengaged therefrom after the first one or two movements, which, being caused by the locomotive, will generally throw the arm $e^2$ beyond the range of the pin $d^2$ in its subsequent movements; and if any greater movement should subsequently occur it would merely move the finger $u$ one or two teeth farther on the trigger $v$, the said finger never being moved except by a blow on the lever $a^2$ heavier than all the preceding ones. When the finger $u$ is released and the clutch $m$ $n$ thrown into engagement by the spring $o$, the movement of the portion $l'$ is limited by the engagement of the stud $l$ at the end of the slot 3, and the force of the spring $o$ is expended on the said stud, instead of being transmitted to the frame-work in the usual manner, and thereby causing additional friction and resistance to the movement of the gate.

The actuating mechanism need not be mounted upon the gate-shaft $b$, and it may sometimes be desirable to mount it independently in the frame-work, to thereby reduce the friction on the said shaft, my invention not being limited to this or any other specific arrangement of the parts.

Any form of clutch or engaging device may be employed, and any form of detent for controlling it.

The actuating mechanism may, if desired, be wound by hand from day to day, the weight or other actuator being sufficient to operate the gate a large number of times, its movements being controlled automatically by the trains.

It may in some instances be desirable to have the gate normally closed and the actuating mechanism operate to open it when engaged therewith.

The gate might be mounted on a vertical, or nearly vertical, shaft, and swing horizontally, and springs might replace weights in every instance.

I claim—

1. The gate mounted on a pivoted shaft and the actuating barrel or drum mounted loose upon the same shaft, combined with the engaging device, whereby the said actuating-drum is thrown into engagement with the said shaft to turn it and swing the gate, substantially as described.

2. The gate mounted to swing on a pivoted shaft, and a counter-weight thereon to cause it to normally assume an extreme position, either open or closed, combined with the actuating-drum loose upon the said shaft, having a weight suspended therefrom, and the engaging device to throw the said drum into engagement with the said shaft and permit it to overcome the counter-weight and cause the gate to change its position, substantially as described.

3. In an automatic railway gate, the following elements, viz: the gate-actuating mechanism normally disconnected from the gate, and a trigger or detent device therefor to cause the said mechanism to engage and operate the gate, combined with a disengaging device and connecting mechanism therefrom to the track, whereby the said disengaging device is positively actuated by the train in passing to disconnect the gate from its actuating mechanism, substantially as described, and for the purpose set forth.

4. In a railway-gate apparatus, the gate and its actuating mechanism and a clutch or engaging device therefor, combined with a track-lever and mechanism, substantially as described, connected therewith, whereby, in the vibrations of the said lever caused by a passing train, the said clutch is disconnected and the actuating mechanism rewound, substantially as set forth.

5. In a railway-gate apparatus for double-track roads, two gates and intermediate gearing, whereby both are made to move together, and actuating mechanism for each, of sufficient power to operate both, controlled by the trains on the respective tracks, as described, whereby, if two trains be approaching at about the same time on the respective tracks the gates will not be opened until both trains have passed and acted upon the respective actuating mechanisms of both gates, substantially as and for the purpose set forth.

6. The gate-shaft and one portion of a clutch or engaging device fixed thereon, and the actuating mechanism and movable portion of the said clutch connected therewith, combined with the locking device for the said movable portion and the stops to limit the movement of the gate-shaft in either direction, as described, in proper position to enable the movable portion of the clutch to pass properly from engagement with the fixed portion into engagement with the locking device and the reverse, substantially as and for the purpose set forth.

7. The clutch and its spring and shipper, combined with the arm to move the said shipper and its operating mechanism actuated by the passing train and detent device therefor, whereby the said clutch is disconnected and the spring retained compressed until the said detent device is operated to release the said shipper and permit the clutch to be engaged by the action of the said spring, substantially as described.

8. The gate-shaft and actuating barrel or drum and clutch, combined with the shipper and disengaging shaft and arm for operating it and the detent-finger connected with the said shaft, and electro-magnet and its armature to control it, substantially as and for the purpose described.

9. The track-lever and finger actuated thereby, combined with a trigger or detent device provided with a series of engaging-points for the said finger, whereby the said finger will be engaged by one of the said points at the end of its movement caused by the track-lever, and will be wholly unaffected by subsequent lesser movements of the said lever, substantially as and for the purpose set forth.

10. The shaft $b$ and the hub $j$ and movable portion $m$ of a clutch loose thereon, combined with the stud $l$ and slot 3 to receive it, and the spring $o$, acting upon the said hub and clutch portion to separate them, the said stud $l$ being adapted to receive the force of the said spring and prevent it from being transmitted to the frame-work or other parts on the shaft $b$, substantially as described.

In testimony whereof I have signed my name to this specification in the presence of two subscribing witnesses.

GEORGE F. FORBES.

Witnesses:
G. W. GREGORY,
ARTHUR REYNOLDS.